US005857380A

United States Patent [19]

Kajino et al.

[11] Patent Number: 5,857,380

[45] Date of Patent: Jan. 12, 1999

[54] STARTER HAVING PLANETARY GEAR REDUCTION DEVICE

[75] Inventors: Sadayoshi Kajino, Nagoya; Tsutomu Shiga, Nukata-gun; Keiichi Matsushima, Toyota; Akifumi Hosoya, Kariya; Masanori Ohmi, Anjo, all of Japan

[73] Assignee: Denso Corporation, Kariya, Japan

[21] Appl. No.: 800,683

[22] Filed: Feb. 14, 1997

[30] Foreign Application Priority Data

| | | | |
|---|---|---|---|
| Mar. 6, 1996 | [JP] | Japan | 8-049139 |
| Mar. 19, 1996 | [JP] | Japan | 8-062598 |
| Feb. 16, 1998 | [JP] | Japan | 8-029484 |

[51] Int. Cl.$^6$ .......... F02N 15/06; F16H 1/32

[52] U.S. Cl. .......... 74/7 E; 74/7 A; 74/411; 475/263

[58] Field of Search .......... 74/7 E, 7 A, 411; 475/263, 264, 265

[56] References Cited

U.S. PATENT DOCUMENTS

| | | | |
|---|---|---|---|
| 4,494,414 | 1/1985 | Hamano | 74/7 E |
| 4,528,470 | 7/1985 | Young et al. | 74/7 E X |
| 4,635,489 | 1/1987 | Imamura et al. | 74/7 E |
| 4,831,895 | 5/1989 | Tanaka et al. | 74/7 E X |
| 4,951,515 | 8/1990 | Morishita et al. | 74/7 E |
| 5,307,702 | 5/1994 | Spellman et al. | 74/7 E |
| 5,323,663 | 6/1994 | Ohgi et al. | 74/7 E |
| 5,760,485 | 6/1998 | Shiga et al. | 290/38 R |

FOREIGN PATENT DOCUMENTS

| | | |
|---|---|---|
| 0127372 | 12/1984 | European Pat. Off. . |
| 582 429 | 2/1994 | European Pat. Off. . |
| 1545478 | 9/1968 | France . |
| 2591696 | 6/1987 | France . |
| 2843984 | 4/1980 | Germany . |
| 59-23065 | 2/1984 | Japan . |
| 63-277859 | 11/1988 | Japan . |
| 2-33872 | 7/1990 | Japan . |
| 2-238171 | 9/1990 | Japan . |

OTHER PUBLICATIONS

Patent Abstracts of Japan 5/1995, re JP–A–7–119600.

*Primary Examiner*—Allan D. Herrmann
*Attorney, Agent, or Firm*—Pillsbury Madison & Sutro LLP

[57] ABSTRACT

To reduce the size of a starter for installing it in a smaller engine compartment, the rotational speed of the starter motor has to be high and it is reduced to a certain speed through a reduction device to obtain a higher torque. To realize a high reduction ratio in a small planetary gear reduction device, an impact force imposed on the device at an instant a starter pinion engages with a engine ring gear and repeating impacts during a cranking period must be reduced. As a coupling between an internal gear and a housing of the reduction device, a flexible or a resilient coupling is disclosed herein. The flexible or resilient coupling relieves an excessive impact force at the engagement by permitting rotation of the internal gear relative to the housing, and reduces noise caused by the cranking impacts by permitting a small vibrating move of the internal gear. The flexible coupling is realized by a combination of a bumpy surface and projections coupled thereto. The resilient coupling is realized by pushing a spring against the bumpy surface.

26 Claims, 13 Drawing Sheets

STARTER HAVING PLANETARY GEAR REDUCTION DEVICE

CROSS-REFERENCE TO RELATED APPLICATIONS

This application is based upon and claims benefit of priority of Japanese Patent Applications No. Hei-8-29484 filed on Feb. 16, 1996, No. Hei-8-49139 filed on Mar. 6, 1996 and No. Hei-8-62598 filed on Mar. 19, 1996, all of the content of which are incorporated herein by reference.

BACKGROUND OF THE INVENTION

1. Field of the Invention

The present invention relates to a starter motor for cranking and starting an engine, more particularly to a starter which has a speed reduction mechanism using a planetary gear device.

2. Description of Related Art

Recently, more starters having a planetary gear reduction device which are small in size and light in weight are used for vehicles because of necessity to save a space in an engine compartment and to reduce fuel consumption. In order to reduce the size and weight of the starter, it is desirable to further increase a reduction ratio of the reduction device of the starter. To increase the reduction ratio of the planetary gear reduction device while keeping the size thereof within a predetermined diameter D (shown in FIG. 7) of an internal gear, it is necessary to reduce a Module (M) of gears as shown in FIG. 6.

Generally, a relation between the Module M and a stress $\sigma_b$ at a tooth foot is expressed in a following equation.

$$\sigma_b = P/(M \times b \times y)$$

where $y=(\cos \alpha \times \phi^2)/(\cos \omega \times 6\psi)$,

- P: Impact force applied to a tooth tip by transmission torque,
- M: Module,
- b: Gear width,
- $\alpha$: Pressure angle,
- $\phi$: Tooth foot width divided by M,
- $\omega$: Angle made by an operating line of P and a line perpendicular to a tooth center line, and
- $\psi$: Distance between a tooth foot and a cross-point of an operating line of P and a tooth center line, divided by M.

As seen from the equation, as the Module M is decreased, the stress $\sigma_b$ becomes larger. On the other hand, in a conventional planetary gear reduction device, the impact force P is applied to gear teeth at a gear engagement and during a cranking period as shown in FIG. 8. Therefore, it has been difficult to decrease the Module M without causing damages of teeth due to the large engagement impact and fatigue of the teeth due to a repetition of the cranking impacts. The damages of the gear teeth often occurs to a sun gear of the planetary gear reduction device.

Because of the reason mentioned above, the Module M of conventional planetary gear reduction devices has been chosen to be more than 1.25 and the reduction ratio to be less than 5.45, as exemplified in Japanese Patent Laid-Open Publication No. Hei-2-238171. Because the Module M cannot be reduced, there has been a certain limit in reducing the size and weight of starter motors.

It has been also attempted to increase the reduction ratio of the planetary gear reduction device by using a multi-stage planetary gear system as shown in Japanese Patent Laid-Open Publication No. Hei-6-159205. The multi-stage reduction system, however, cannot make the device small and light.

SUMMARY OF THE INVENTION

The present invention has been made in view of the above-mentioned problems, and an object of the present invention is to provide a starer having a planetary gear reduction device which is small in sized and light in weight by means of reducing the Module M to less than 1 and realizing the reduction ratio of more than 6. Another object of the present invention is to reduce the impact force given to the gears at an engagement and during a cranking period even when the smaller Module M is employed. Further object of the present invention is to realize a planetary gear reduction device in which the noise occurring during starting an engine due to backlash of the gears is reduced.

To realize a starter having a planetary gear reduction device which has a reduction ratio higher than 6 with a gear Module less than 1 while avoiding any damages of the gears caused by an engagement impact, the present invention provides an improved coupling of an internal gear and a center case in which the internal gear can rotates relative to the center case when an excessive engagement force is applied to the internal gear at an instance a starter pinion engages with a ring gear of an engine. By the relative rotation of the internal gear, the engagement impact is reduced and thereby avoiding any damages of the gears in the reduction device. The coupling may be a flexible coupling between a resin material having a flexibility and a projection made of a hard material. The coupling may be a resilient coupling using a spring pressed on a surface with bumps and depressions thereon.

The engagement impact can be also reduced by reducing a rotational speed of a starter motor when the starter pinion engages to the ring gear of an engine.

A repetition impact imposed on the reduction gears during a cranking period is also reduced by the flexible or resilient coupling of the internal gear and the center case according to the present invention. Possible damages of the gears due to material fatigue caused by repeated imposition of the cranking impact can be avoided.

To reduce the noise caused by gear backlashes during the cranking period, the internal gear coupling to the center case according to the present invention allows the internal gear to move relative to the center case in a small amount back and forth. This small amount of movement can absorb the vibration of the device, thereby reducing the noise during the cranking period.

Other objects and features of the present invention will become more readily apparent from a better understanding of the preferred embodiment described below with reference to the following drawings.

DETAILED DESCRIPTION OF THE PREFERRED EMBODIMENTS

Figure 1:
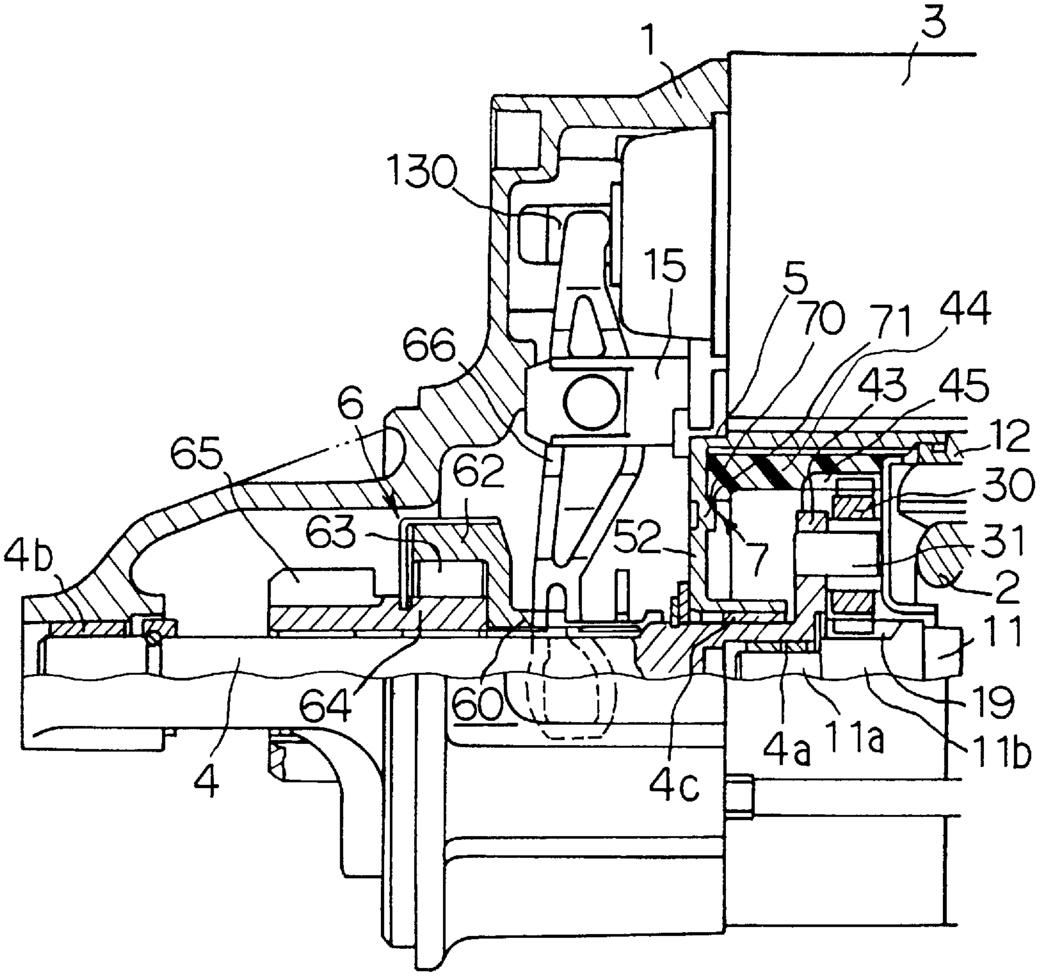
FIG. 1 is a cross-sectional view showing a key portion of a starter having a planetary gear reduction device according to a first embodiment of the present invention.

FIG. 1 shows a key portion of a starter having a planetary gear reduction device according to a first embodiment of the present invention. On the right side of housing 1, a starter motor 2 is mounted, and a magnet switch 3 is mounted on the upper side of the housing 1. An armature shaft 11 of the motor 2 is supported by an end bracket (not shown in the drawing) of the motor 2 at its right side and by a bearing 4*a* at its left side. The bearing 4*a* supports the armature shaft 11 at its left end 11*a* having a reduced diameter. 12 denotes a yoke of the motor. A sun gear 19 is formed on the armature shaft 11 at its portion 11*b*. A drive shaft 4 coaxially extending to the left side of the armature shaft 11 is supported by the housing 1 via a bearing 4*b* at its left end and by a center case 5 via a bearing 4*c* at its right end.

A spline tube 60 is disposed coaxially with the drive shaft 4 in a helical spline connection. The spline tube 60 is connected to a pinion 65 via a clutch outer 62, rollers 63 and a clutch inner 64, three of which constitute a one way clutch 6. A shift lever 66 is rotatably supported by a shift lever support 15 which is fixed to the housing 1. One end of the shift lever 66 is connected to an outer surface of the spline tube 60 and the other end thereof is connected to a plunger 130 of the magnet switch 3.

Figure 2:
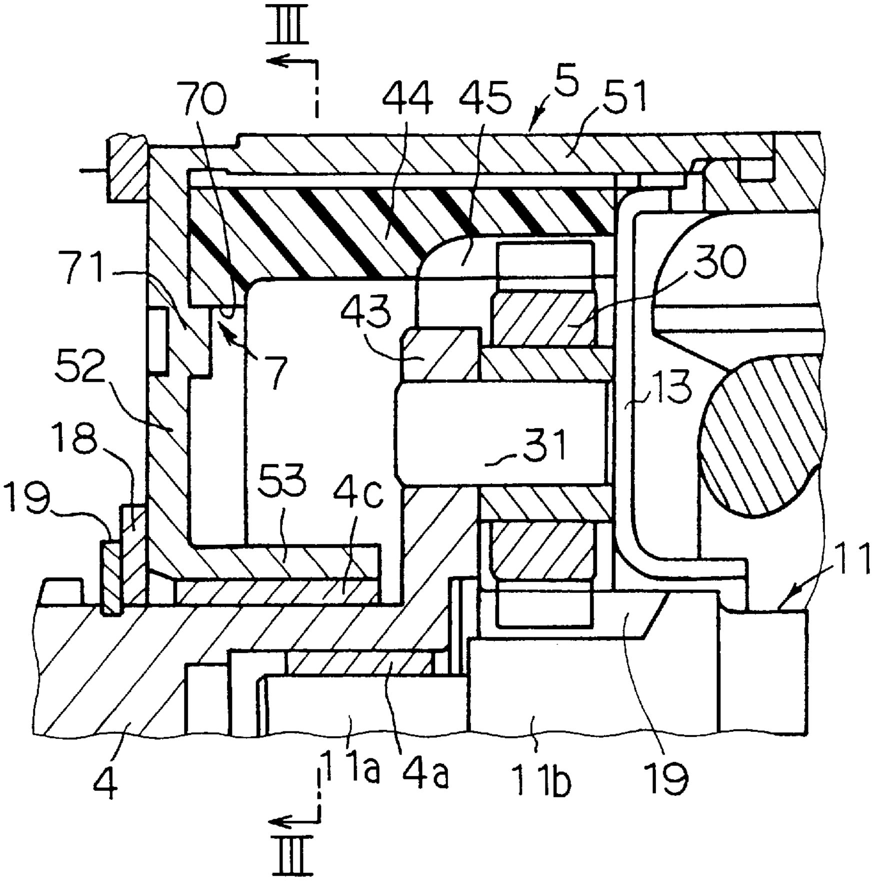
FIG. 2 is a cross-sectional view showing a planetary gear reduction device of the first embodiment according to the present invention.
Figure 6:
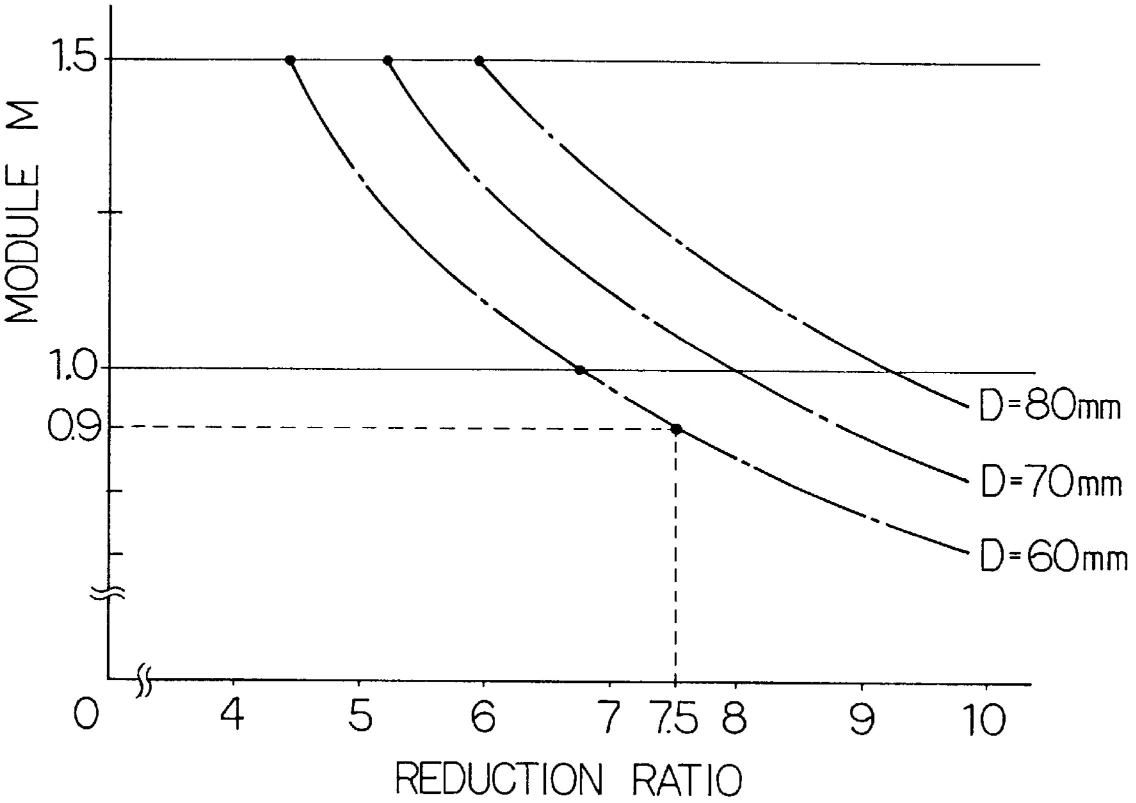
FIG. 6 is a graph showing a relation between a reduction ratio and Module M.
Figure 7:
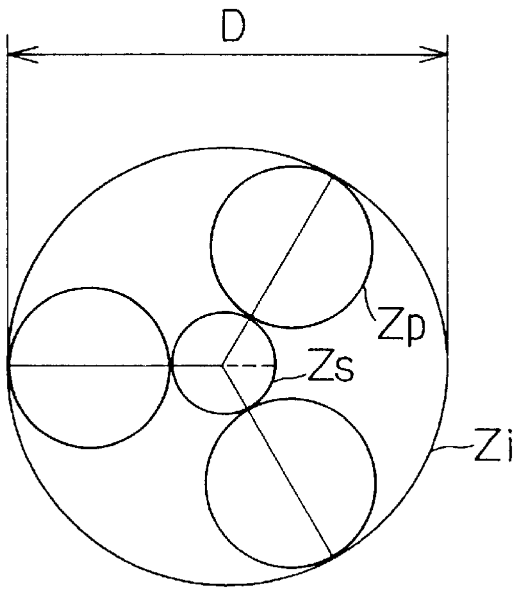
FIG. 7 is a drawing showing an arrangement of gears used in a planetary gear reduction device.
Figure 8:
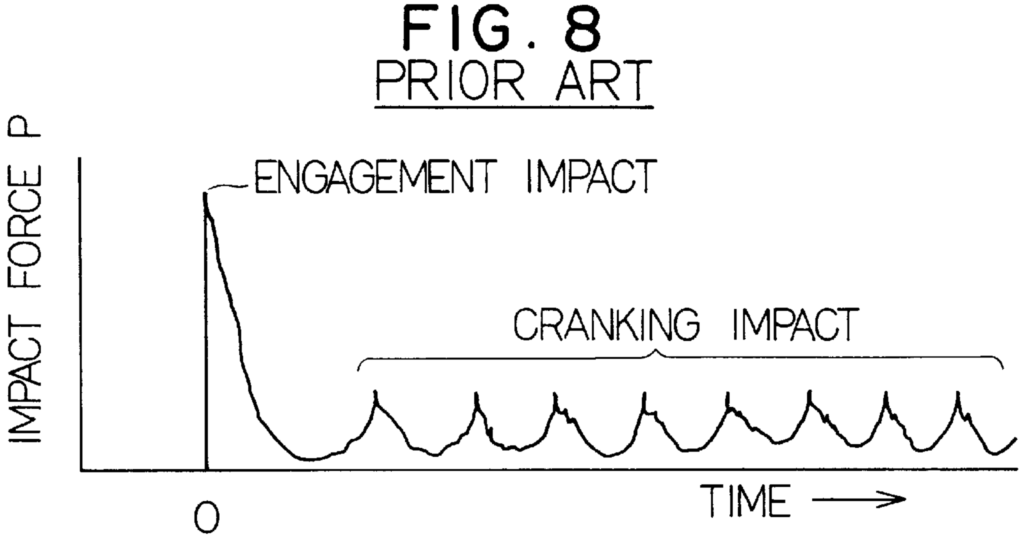
FIG. 8 PRIOR ART
FIG. 8 is a graph showing impact force P at an engagement and during a cranking period in a conventional planetary gear reduction device.

Referring to FIG. 2, a planetary gear reduction device will be explained. A flange 43 having a larger diameter is formed at the right end of the drive shaft 4. Three pins 31 are fixed to the flange 43 and rotatably support respective planetary gears 30. The planetary gear 30 engages with a sun gear 19 at its center side and with a gear 45 of an internal gear 44 at its outer side. In this particular embodiment, the number of teeth $Z_p$ of the planetary gear 30 is 22, the number of teeth $Z_s$ of the sun gear 19 is 8, and the number of teeth $Z_i$ of the gear 45 is 52. A Module M is 0.9 and a reduction ratio of 7.5 is attained (refer to FIG. 6).

The internal gear 44 has a cylindrical shape with both ends open and the gear 45 is formed on its inside. The internal gear 44 is disposed coaxially with the armature shaft 11. The center case 5 has a substantially cylindrical shape with one end open and the other end closed with an end wall 52, and is fixed to the housing 1 at its outer surface. The center case 5 and a plate 13 disposed at its open end form a gear compartment in which the planetary gear reduction device is contained. The center case 5 is composed of a large cylinder 51, small cylinder 53 and the end wall 52. The small cylinder 53 supports the drive shaft 4 through the bearing 4*c*, and the end wall 52 is stopped on the drive shaft 4 by a ring 19 via a stress washer 18.

Figure 3:
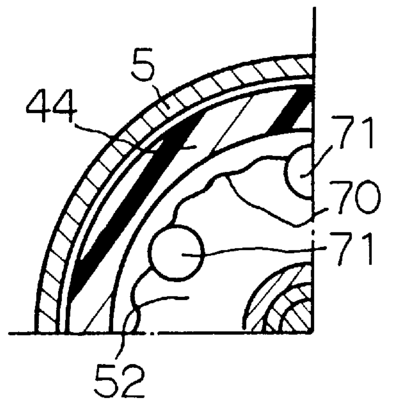
FIG. 3 is a cross-sectional view showing a way of connecting an internal gear to a center case, taken along a line III—III of FIG. 2.

Now, a flexible coupling 7 which flexibly connects the internal gear 44 to the center case 5 which is fixed to the housing 1 will be explained. A surface 70 with bumps and depressions is formed at the left end portion of the internal gear 44 as shown in FIGS. 2 and 3. The bumps and depressions of an about 1mm height are formed on the surface 70 of the internal gear 44 with an about 36° angular interval as shown in FIG. 3. In this particular embodiment, the bumps and depressions are formed on a circle having an average radius of 25 mm, and an axial length thereof is about 10 mm.

On the other hand, projections 71 are formed on the end wall 52 of the internal gear 44 which fit with the depressions formed on the surface 70. The number of the projections 71 formed on the end wall 52 is 6, and they are formed at an equal interval. The projection 71 is column-shaped with a 8 mm height and a 6 mm radius in this particular embodiment.

The surface 70 with bumps and depressions and the projections 71 constitute the flexible coupling according to the present invention.

Now, the operation of the first embodiment described above will be explained.

As the magnet switch 3 is energized, the plunger 130 is pulled to the right and the shift lever 66 moves clockwise thereby pushing the spline tube 60 to the left. The pinion 65 is pushed to the left together with the one-way clutch 6. Just before the pinion hits the ring gear (not shown in the drawing) of the engine, the starter motor 2 begins to rotate and the pinion 65 engages with the ring gear of the engine. The rotational torque of the armature shaft 11 is transmitted to the pinion 65 through the sun gear 19, planetary gears 30, the drive shaft 4, the spline tube 60 and the one-way clutch 6. The rotational speed of the armature shaft 11 is reduced by the planetary gear device. The ring gear of the engine is rotated by the pinion 65. The projections 71 of the center case 5 are engaged with the depressions of the surface 70 of the internal gear 44, and accordingly the internal gear 44 is fixed to the center case 5 and does not rotate.

When the pinion 65 engages with the ring gear, an engagement impact is given to the pinion 65 and a reaction torque is transmitted to the sun gear 19 and the internal gear 44 through the drive shaft 4. If the reaction torque is larger than the torque loosening the connection between the projections 71 and the depressions of the surface 70, the projections 71 climb over the bumps of the surface 70 and the internal gear 44 rotates relative to the center case 5. Thus, the excessive impact is relieved so that the teeth of gears are protected from any damages. Of course, the torque loosening the connection between the internal gear 44 and the center case 5 is set below the torque which may give any damages to the gear teeth. Energy of the engagement impact is converted to heat energy by the friction between the projections 71 and the surface 70 with bumps and depressions.

The cranking impact force which is smaller than the loosening torque is relieved by distortion or twist of the internal gear 44 (refer to FIG. 9), since the internal gear is made of a resin having a certain flexibility, and the coupling between the internal gear 44 and the center case 5 is formed at the left end of the internal gear 44 while the inner gear 45 of the internal gear 44 are formed at the right end of the internal gear 44.

Therefore, the engagement impact transmitted from the inner gear 45 to the planetary gears 30, the sun gear 19 and other portions of the reduction mechanism is cut by the relative rotation between the internal gear 44 and the center case 5. The cranking impact is also relieved by the flexibility of the internal gear 44. Accordingly, any damages to the gear teeth are avoided and the noise occurring during starting period is effectively reduced. Moreover, since the friction heat generated at the flexible coupling 7 when the internal gear slips relative to the center case 5 is not transferred to the inner gear 45, any trouble due to its thermal fatigue or lubrication are effectively avoided. In short, two kinds of the impact force during the starting period are effectively absorbed in the reduction device according to the present invention.

The internal gear 44 is made of a nylon material having a strength suitable to absorb the impacts. The internal gear 44 is manufactured by molding the nylon material. The center case 5 is made of a carbon steel plate by a deep drawing process and a multi-stage stamping process. The projections 71 are formed during these processes. The projections 71 can be substituted by a surface having bumps and depressions or any other suitable forms.

Figure 9:
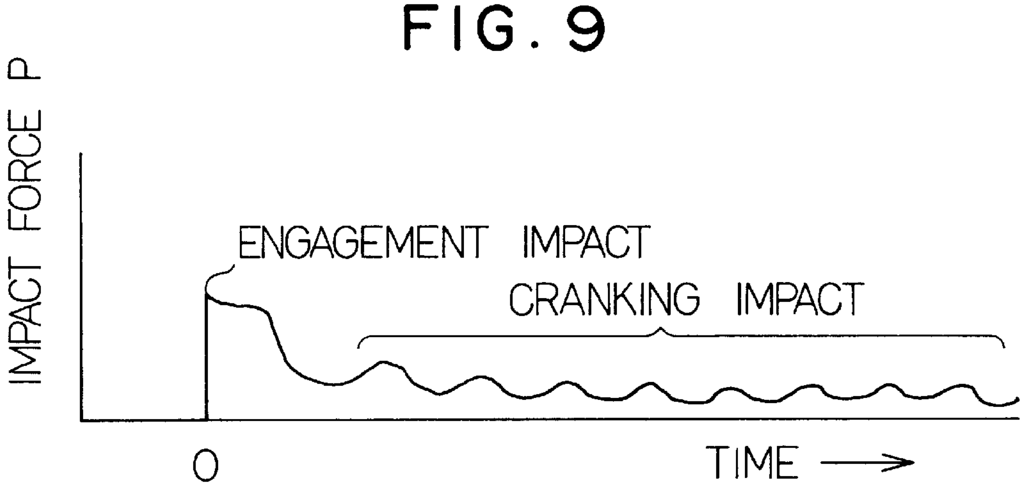
FIG. 9 is a graph showing impact force P at an engagement and during a cranking period in a planetary gear reduction device according to the present invention.

As shown in FIG. 9, the engagement impact force P is cut so that it does not exceed the gear tooth strength, and the repeating cranking impact force is also reduced to a permissible level. In this particular embodiment, the first embodiment, the reduction ratio of 7.5 is realized by using an internal gear having a 60 mm diameter and a Module of 0.9 (refer to FIG. 6). As a result, the size of the motor is reduced by 30 percent. In addition, it is also possible to reduce the size of clutch 6, to make the housing 1 thinner, to prevent damages of the ring gear 14 and to reduce an abrasion of the ring gear, because the impact forces are reduced according to this invention.

Figure 4:
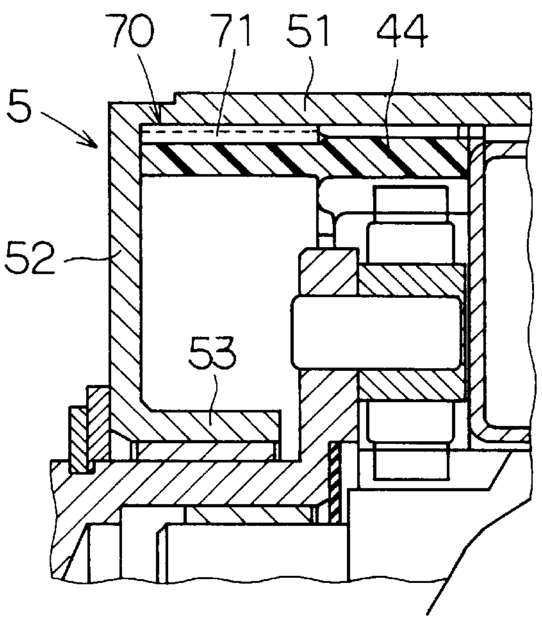
FIG. 4 is a cross-sectional view showing a planetary gear reduction device of a second embodiment according to the present invention.

A second embodiment according to the present invention is shown in FIG. 4. In this embodiment, the surface 70 with bumps and depressions is formed on an outer surface of the internal gear 44 at its left side portion. The projections 71 are formed on an inner surface of the center case 5. The surface 70 and projections 71 constitute the flexible coupling 7 which functions in the same manner as in the first embodiment.

Figure 5:
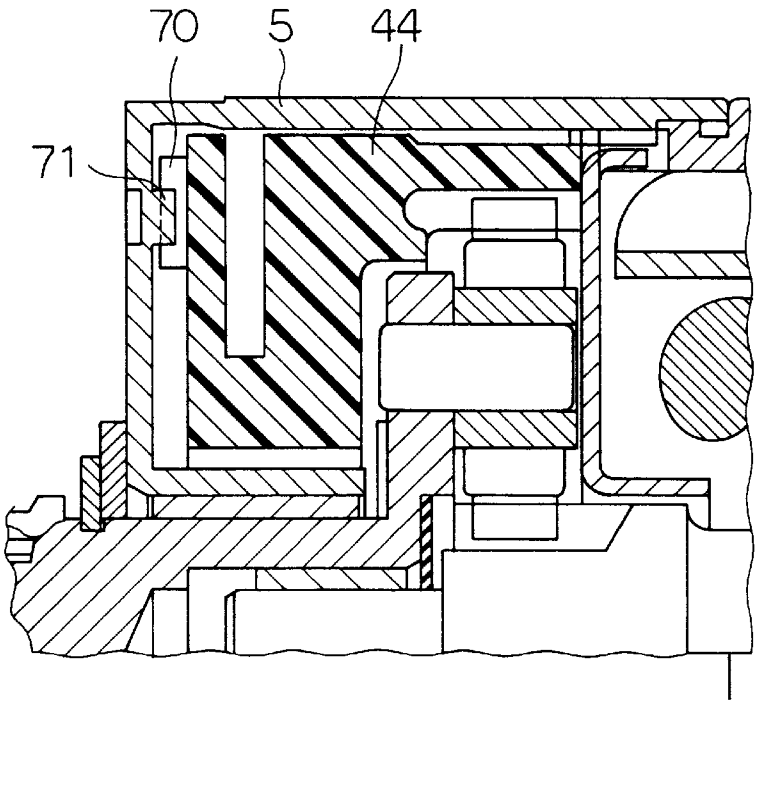
FIG. 5 is a cross-sectional view showing a planetary gear reduction device of a third embodiment according to the present invention.

A third embodiment according to the present invention is shown in FIG. 5. In this embodiment, the surface 70 with bumps and depressions is formed on a left side surface of the internal gear 44 as shown in the drawing. The projections 71 are formed on the end wall of the center case 5. The surface 70 and the projections 71 constitute the flexible coupling 7 which functions in the same manner as in the first embodiment. In this third embodiment, since the impact force occurring when the connection between the surface 70 and the projections 71 is loosened is converted into a thrust force and a distortion force of the internal gear 44, the reduction mechanism is well protected from the impact forces.

Figure 10:
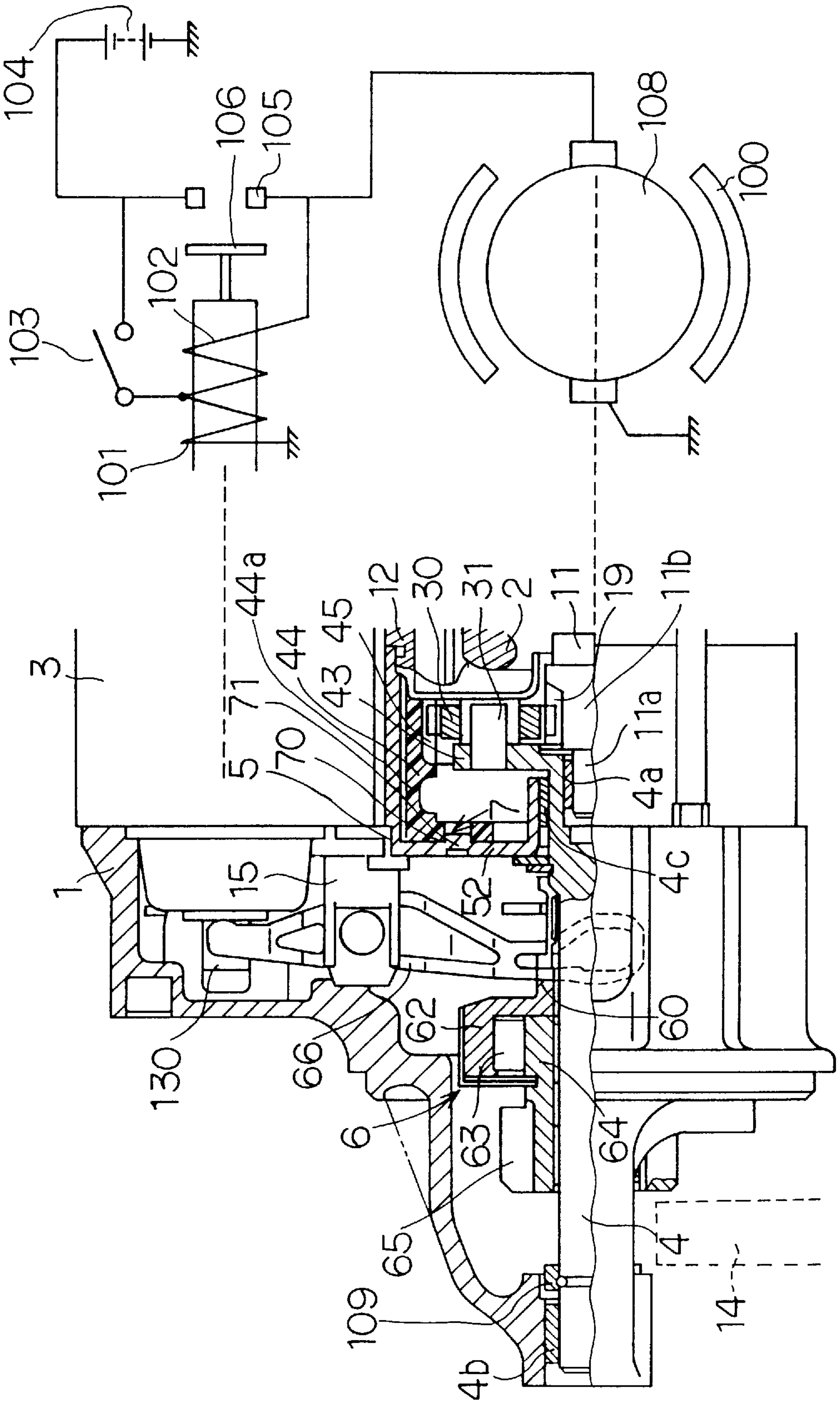
FIG. 10 is a drawing showing key portions of a fourth embodiment according to the present invention.

Next, a fourth embodiment according to the present invention will be explained in reference to FIG. 10. When a switch 103 is closed, a holding coil 101 and a pulling coil 102 are energized and the plunger 130 is pulled to the right. The shift lever 66 rotates clockwise, pushing the spline tube 60 to the left and thereby advancing the pinion 65 to the left to make it engage with the ring gear 14. At an instance the pinion 65 hits the ring gear 14, a stationary contact 105 of the magnet switch 3 is not yet closed by a moving contact 106. An electric current flowing in the pulling coil 102 is supplied to the armature 108 of the starter motor 2 and thereby the armature 108 rotates slowly. The pinion 65 is also rotated slowly through the drive shaft 4 and it engages with the ring gear 14. When the pinion 65 advances to a stopper 109 and fully engages with the ring gear 14, the stationary contact 105 is closed by the moving contact 106 and a full current is supplied to the armature 108 from a battery 104, rotating the armature 108 at a rated speed.

Figure 11:
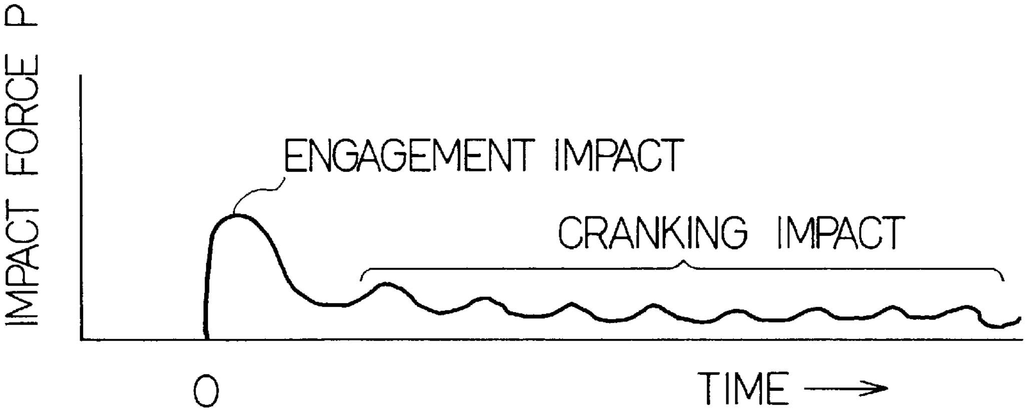
FIG. 11 is a graph showing impact force P at an engagement and during a cranking period in a fourth embodiment according to the present invention.

As mentioned above, since the pinion 65 rotates slowly when it hits the ring gear 14, it can engage smoothly with the ring gear. After the pinion 65 fully engages with the ring gear 14, it is fully rotated by the armature. In this way of operating the starter motor, the engagement impact force can be considerably decreased as shown in FIG. 11. Also, the cranking impact is effectively absorbed by distortion or twist of the internal gear 44 made of a resin material.

The flexible coupling 7 in the foregoing embodiments is constituted by the surface 70 formed on the internal gear 44 and the projections 71 formed on the center case 5. The flexible coupling 7, however, can be modified in other forms different from the particular embodiments described above. For example, the projections 71 can be formed on the internal gear 44 and the surface 70 with bumps and depressions on the center case 5.

The Module M of the gears may be expressed in other forms such as diametral pitch DP. The Module M less than 1 which is aimed at in this invention corresponds to a DP larger than 25.4.

For absorbing the shock or impact force during the starting operation, other forms of the absorber such as a friction plate shown in Japanese Patent Publication No. Hei-2-33872 and a resilient body disposed between an internal gear and a starter frame shown in Japanese Patent Laid-Open Publication Sho-59-23065 can be used without departing from the scope of the present invention.

Figure 12:
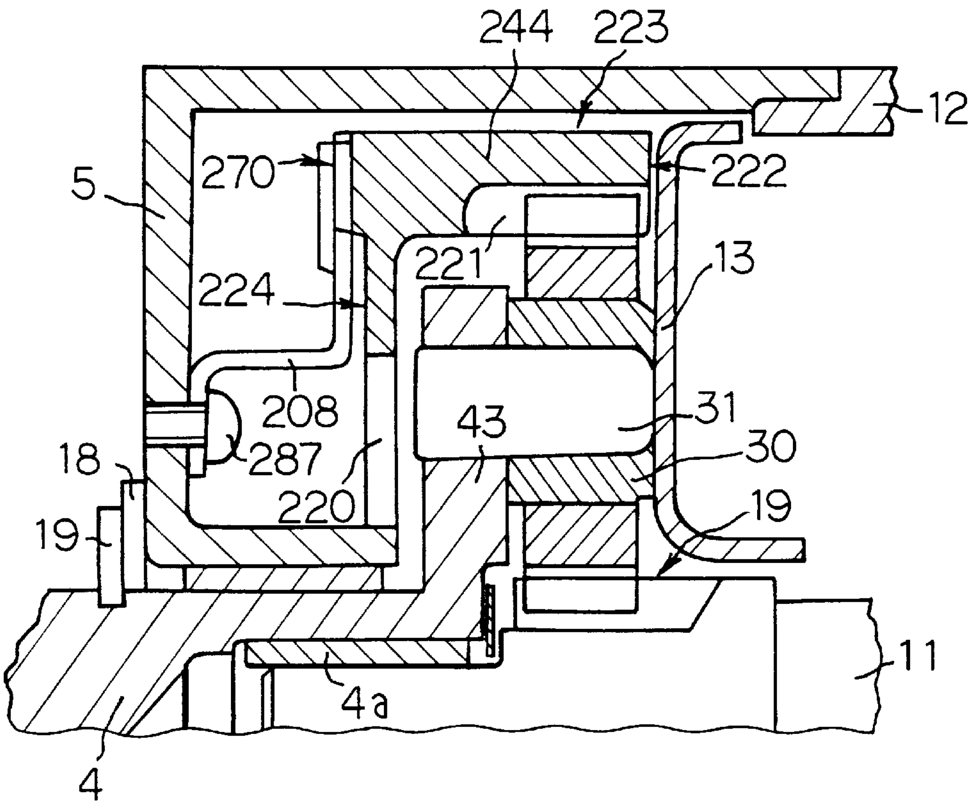
FIG. 12 is a cross-sectional view showing a planetary gear reduction device of a fifth embodiment according to the present invention.

Now, referring to FIG. 12, a fifth embodiment according to the present invention will be explained. In FIG. 12, the flexible coupling 7 of the foregoing embodiments is replaced by a resilient coupling using a spring 208 and a surface 270 with bumps and depressions, and other components and their construction are substantially the same as in the foregoing embodiments. A planetary gear reduction device of the fifth embodiment is composed of an internal gear 244, a sun gear 19, planetary gears 30, a drive shaft 4, a center case 5 and a plate 13. A space defined with the center case 5 and the plate 13 contains the reduction device therein.

Figure 13:
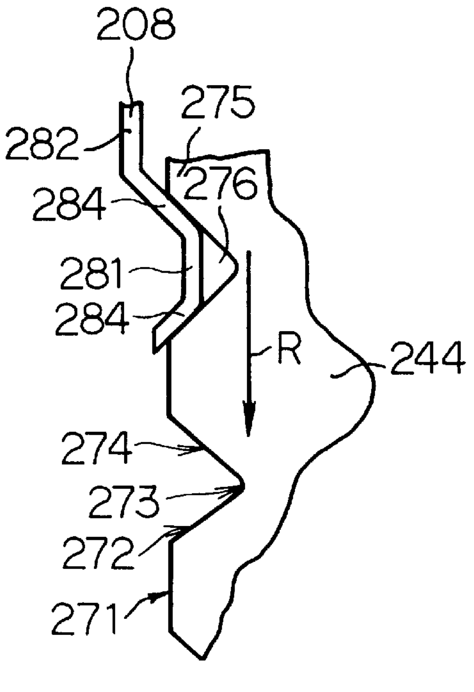
FIG. 13 is a partially enlarged view showing a way of a contact of an internal gear and a spring in the fifth embodiment according to the present invention.

On a front surface 224 of the internal gear 244, the surface 270 with bumps and depressions is formed. A spring 208 is fixed to the center case 5 and resiliently pressing the surface 270. As shown in FIG. 13, the surface 270 includes bumps 275 in a shape of a trapezoid having a descending slope 272 and an ascending slope 274 and depressions 276 which are formed alternately. The spring 208 includes an arm portion 282, a contacting portion 281 and slopes 284, and is disposed to resiliently press down the surface 270. A rotational torque due to the engagement impact force is applied in a direction R.

Figure 14A:
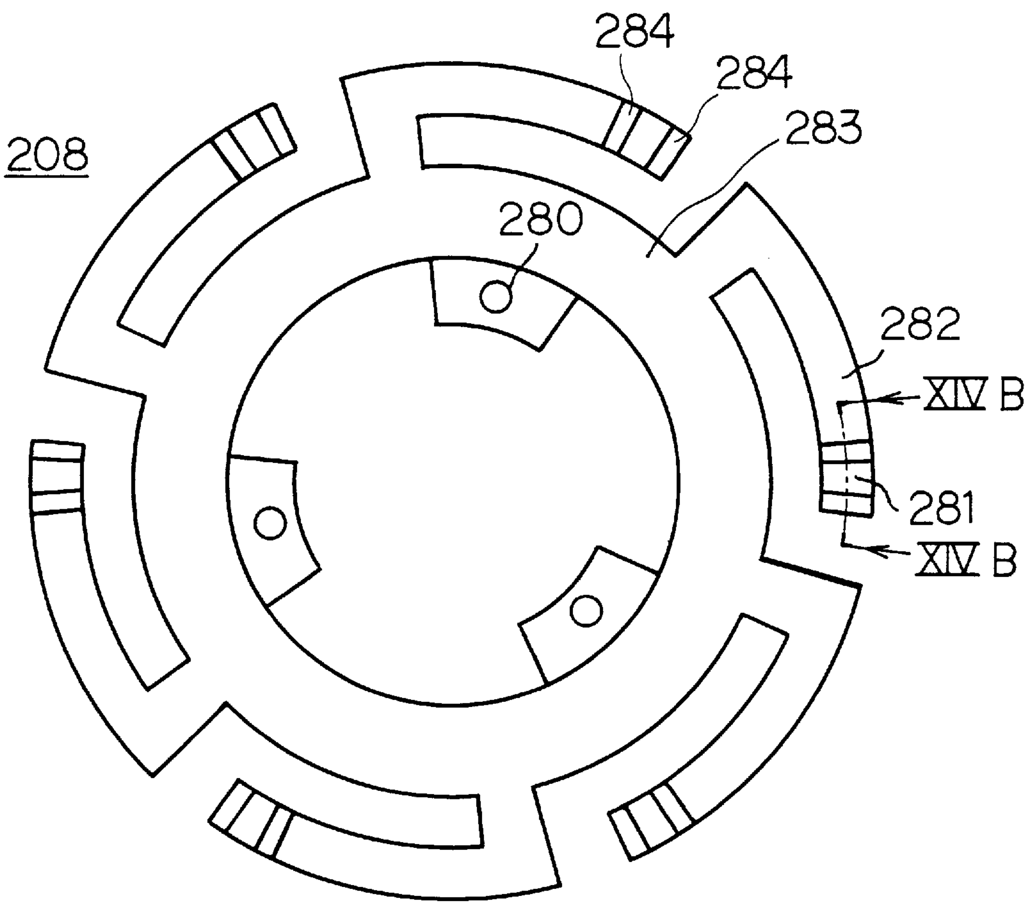
FIG. 14A is a plan view showing a spring plate used in the fifth embodiment according to the present invention.
Figure 14B:
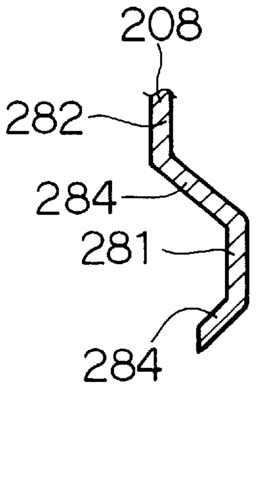
FIG. 14B is a partial cross-sectional view taken along a line XIVB—XIVB of FIG. 14A.

As shown in FIGS. 14A and 14B, the spring 208 is made generally in a shape of a ring having six arm portions 282 extending therefrom at an equal interval. Each arm portion 282 has a contacting portion 281 and slopes 284 at its tip. On a ring portion 283, three angle portions having fixing holes 280 are formed. The spring 208 is fixed to the center case 5, as shown in FIG. 12, by screws or rivets 287 inserted in the fixing holes 280. The bumps 275 and depressions 276 are arranged on the surface 270 so that all of the contacting portions 281 of the spring 208 contact the bumps 275 or the depressions 276 simultaneously.

The resilient coupling described above functions in the following manner, responding the torque imposed on the internal gear 244. When no torque is imposed on the internal gear 244, the spring 208 presses down the depressions 276 stably. When a normal torque is imposed on the internal gear 244 in the direction R, the slopes 284 of the spring 208 contact the ascending slopes 274 and stay there, because the torque is not large enough to push up the slope 284 to the top of the bumps 275. Therefore, under the condition of the normal torque, the internal gear 244 does not rotate relative to the center case 5, and accordingly the starter motor rotational torque is transmitted to the drive shaft 4 through the reduction device.

When a large torque generated by an engagement impact is imposed on the internal gear 244, the contacting portions 281 and the slopes 284 of the spring 208 climb up the ascending slope 274 and the internal gear 244 rotates relative to the center case 5. Accordingly, an excessive impact force is cut by the resilient coupling, and the impact force imposed on the reduction device is relieved. As soon as the large torque condition disappears, the resilient coupling returns to the states under the no torque or the normal torque condition. Since the excessive impact is thus relieved by the resilient coupling, the reduction device can be made small in size and at low cost, avoiding strengthening its structure to endure the excessive impact.

Under a variable torque condition during the cranking period where the torque from an engine is periodically transmitted to the drive shaft 4 and a pulsating torque having a positive or negative value is imposed on the internal gear 244, the contacting portions 281 and the slopes 284 of the spring 208 ascend or descend the ascending slope 274 according to the pulsation of the torque, thereby permitting the internal gear 244 to rotate back and forth relative to the center case 5 within a limited small angle. Thus, the torque pulsation is absorbed by a resilient deformation of the spring 208 and a friction between the spring 208 and the surface 270, and the noise due to the backlash of the gears and etc. is also suppressed.

Figure 15:
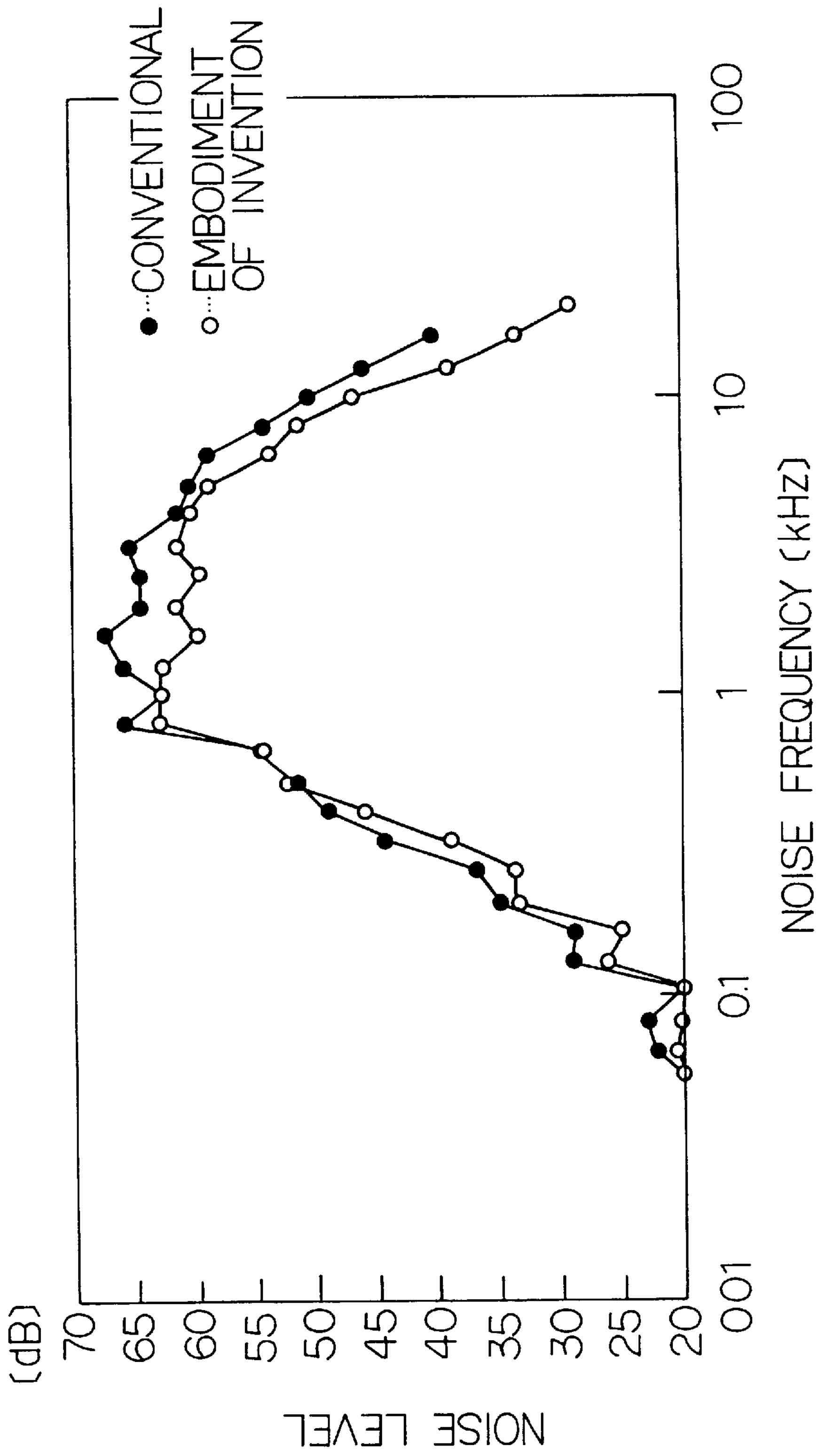
FIG. 15 is a graph showing a noise level comparison between a conventional device and the fifth embodiment of the present invention.

To confirm the noise suppression effect of this embodiment, the level of the noise during a starting period of an engine is measured. A starter having a planetary gear reduction device of this embodiment is mounted on an automotive vehicle, and the starting noise is picked up by a microphone placed at a distance of 1 meter from the vehicle. The result of the measurement is shown in FIG. 15 in which the noise level in dB versus noise frequencies of a whole audible range is shown. Black dots in the graph show the noise level of a conventional starter and white dots show that of the embodiment according to the present invention. It is clear from this graph that several dBs of the noise is decreased.

In the fifth embodiment, the surface 270 with bumps and depressions is formed on the front surface 224 of the internal gear 244, and the spring 208 fixed on the center case 5 is disposed to press down the surface 270 from the front. The surface 270 can be formed easily in a manufacturing process of the internal gear 244. Also, the spring 208 can be manufactured easily by stamping processes. Assembling the internal gear 244 with the center case 5 is also easy because the spring 208 is fixed to the center case 5 before inserting the internal gear 244. An axial length required to dispose the spring 208 in a space between the center case 5 and the internal gear 244 is not so long, and accordingly increase of the size of the reduction device is minimal.

The fifth embodiment of the present invention which can be manufactured at low cost not only reduces the impact force but suppresses the noise caused by the gear backlash.

Figure 16A:
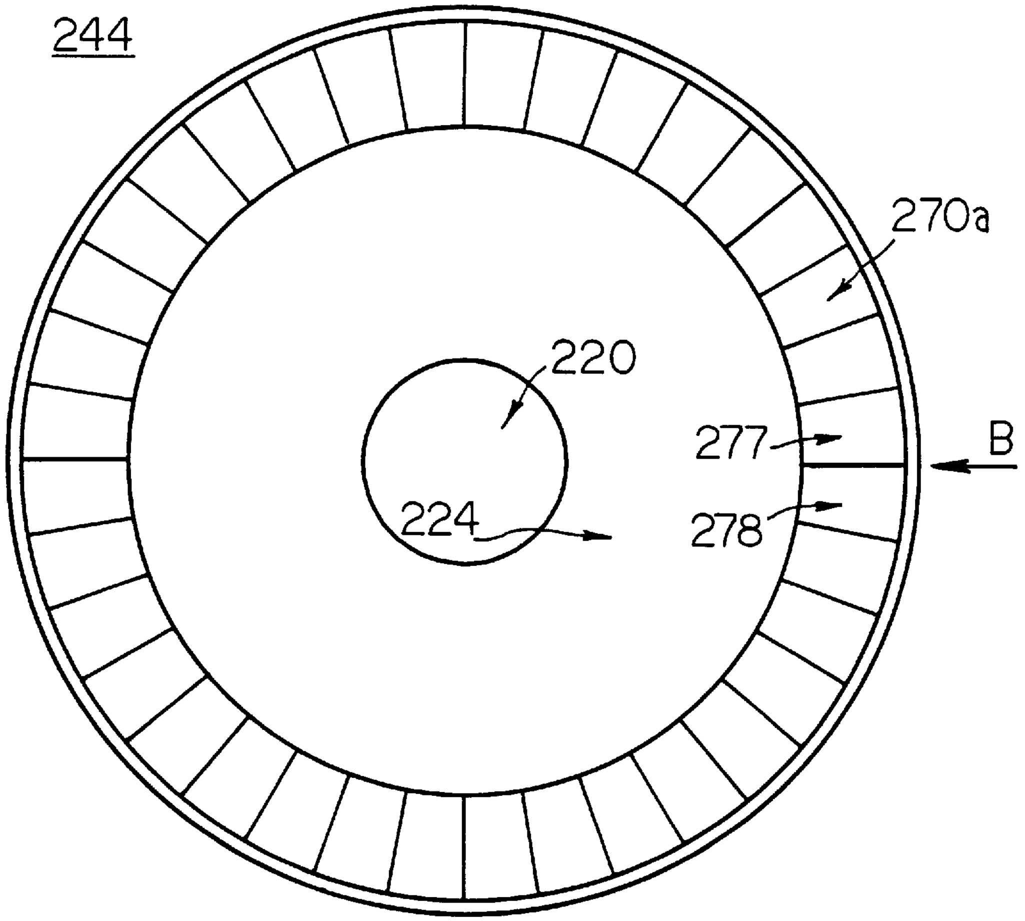
FIG. 16A is a front view showing a surface with bumps and depressions of an internal gear of a modification 1 of the fifth embodiment according to the present invention.
Figure 16B:
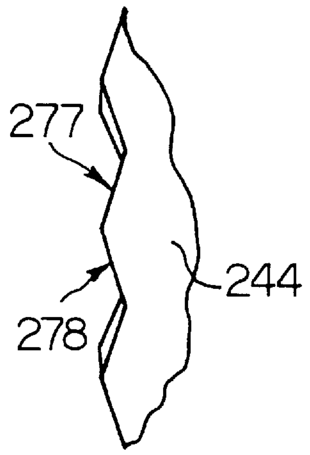
FIG. 16B is a partial side view of the surface shown in FIG. 16A, viewed in a direction of an arrow B.

The resilient coupling in the fifth embodiment may be modified in other forms. FIGS. 16A and 16B show a modification 1 in which the surface 270 with bumps and depressions is modified. In place of the surface 270 of the fifth embodiment, a surface 270*a* with only ascending slopes 277 and descending slopes 278 is formed on an outer periphery of the front surface 224 of the internal gear 244. The form of the ascending and descending slopes is not necessarily required to be in the form shown in FIGS. 16A and 16B. The slopes may be, for example, in a form of a sinusoidal wave or a saw tooth. The form of the surface 270*a* may be chosen in many ways in consideration of manufacturing processes, cost, durability and so forth.

Figure 17A:
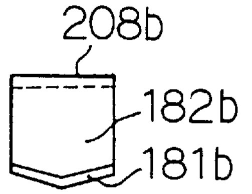
FIG. 17A, 17B and 17C show a spring of a modification 2 of the fifth embodiment according to the present invention, and are a plan, a front and a side view, respectively.
Figure 17B:
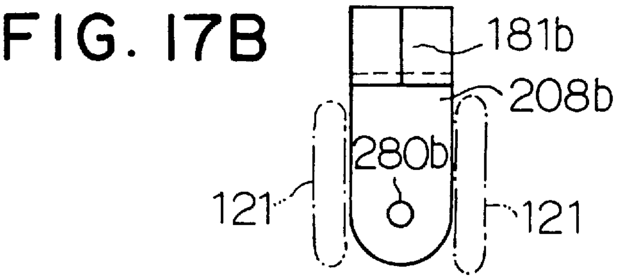
Figure 17C:
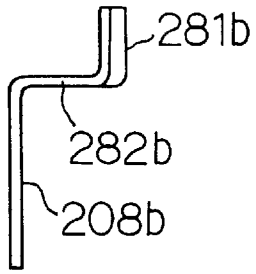

FIGS. 17A, 17B and 17C show a modification 2 of the fifth embodiment in which the spring 208 is modified to a different shape. A spring 208*b* used in the modification 2 has a shape of an angled claw. The spring 208*b* is composed of a contacting portion 281*b* and an arm portion 282*b*. The spring 208*b* is fixed to the center case 5 by a screw or a rivet which is inserted into a fixing hole 280*b*. The spring 208*b* is mounted between projections 121 formed on the end wall 52 of the center case 5 to prevent rotation of the spring 208*b*. The number of the spring 208*b* used in this modification may be only one or a plurality. In the same manner as in the fifth embodiment, the contacting portion 281*b* of the spring 208*b* presses down the surface 270 with bumps and depressions, which constitutes the resilient coupling between the internal gear 244 and the center case 5. The surface 270 may be replaced by the surface 270*a* of the modification 1.

Figure 18:
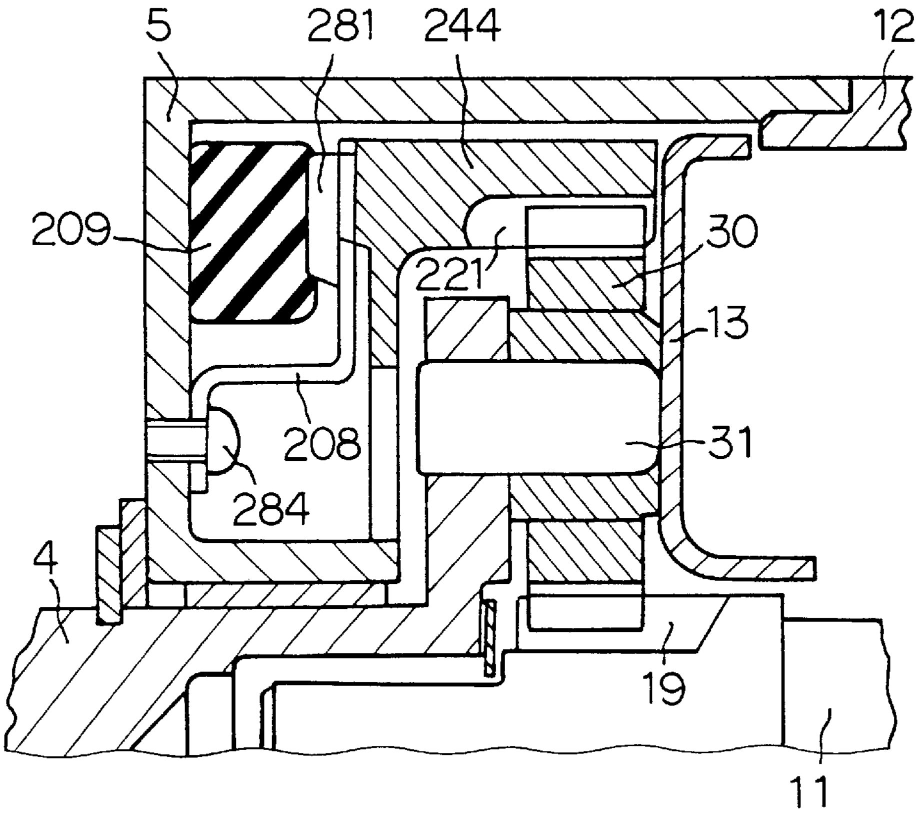
FIG. 18 is a cross-sectional view showing a planetary gear reduction device in a modification 3 of the fifth embodiment according to the present invention.

FIG. 18 shows a modification 3 of the fifth embodiment in which a rubber cushion 209 disposed between the spring 208 and the center case 5 is added. The rubber cushion 209 reinforces the pressing down force of the spring 208 against the internal gear 244. Because of an additional resilient force of the cushion rubber 209, the resilient coupling force between the internal gear 244 and the spring 208 can be large enough to prevent the relative rotation even when the diameter of the internal gear 244 is small relative to the impact force. The rubber cushion 209 may be fixed to the center case 5 by an adhesive. In the case where the spring 208*b* of the modification 2 is used, the rubber cushion 209 may be donut-shaped. The shape or the material of the cushion 209 may be variously chosen according to design needs of the reduction device.

The fifth embodiment may be further modified in such a way that the surface 270 with bumps and depressions is formed on the end wall 52 of the center case 5 and the spring 208 is fixed on the internal gear 244. In this configuration, when an excessive torque is imposed on the internal gear 244, the internal gear 244 rotates together with the spring 208 relative to the center case 5 and the surface 270 with bumps and depressions does not rotate.

Figure 19:
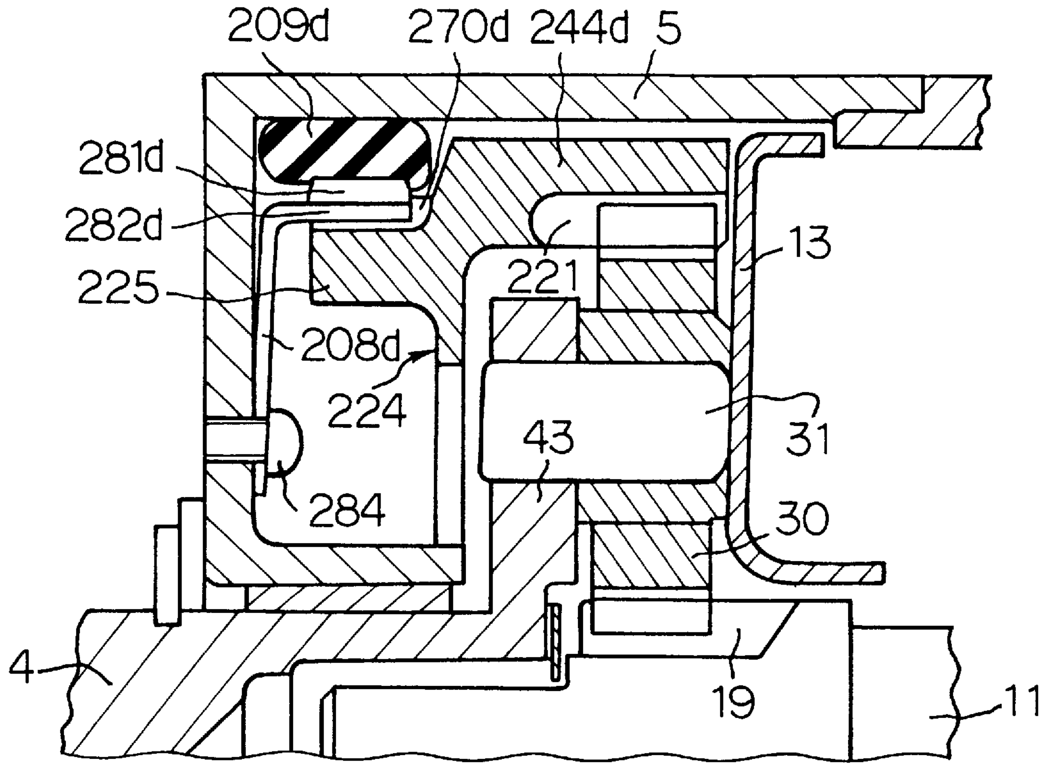
FIG. 19 is a cross-sectional view showing a planetary gear reduction device of a sixth embodiment according to the present invention.

FIG. 19 shows a sixth embodiment according to the present invention. In this embodiment, a surface 270*d* with bumps and depressions is formed on an outer periphery of a front portion 225 extending from an internal gear 244*d*, and a contacting portion 281*d* of a spring 208*d* is disposed between the outer periphery of the front portion 225 and the center case 5. The rubber cushion 209*d* is disposed between the contacting portion 281*d* and the center case 5. This embodiment is substantially the same as the fifth embodiment except the way of constituting the resilient coupling mentioned above, and functions substantially in the same manner as the fifth embodiment. The rubber cushion 209*d* functions in the same manner as the rubber cushion 209 of the modification 3 of the fifth embodiment.

The fifth and sixth embodiments described above may be further modified in various forms. For example, the surface 270 with bumps and depressions may be formed on an outer surface 223 of the internal gear 244 (refer to FIG. 12), and the spring 208 may be fixed on an inner cylindrical surface of the center case 5. The surface 270 with bumps and depressions may be formed on a rear end surface 222 of the internal gear 244, and the spring 208 may be fixed on an inner cylindrical surface of the internal gear 244 or on the plate 13. Further, the surface 270 with bumps and depressions may be formed on an inner surface of an opening 220 of the internal gear 244, and the spring 208 may be fixed on the end wall 52 of the center case 5. It is also possible to reverse the positions of the surface 270 and the spring 208 in the forms mentioned above. That is, the surface 270 with bumps and depressions may be made on the center case 5 or the plate 13, and the spring 208 may be fixed on the internal gear 244.

Figure 20:
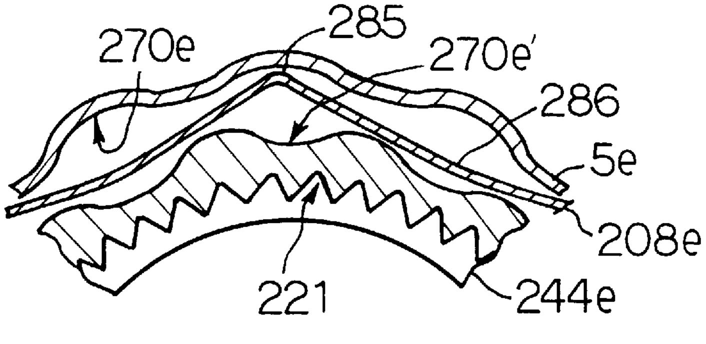
FIG. 20 is a partial cross-sectional view showing a combination of an internal gear, a spring and a center case of a seventh embodiment according to the present invention.

FIG. 20 shows a seventh embodiment according to the present invention. In this embodiment, a cylindrical portion of a center case 5*e* has a surface 270*e* with bumps and depressions, and another surface 270*e*' with bumps and depressions is formed on an outer surface of an internal gear 244*e*. Between the two surfaces 270*e* and 270*e*', a wave-shaped spring plate 208*e* is inserted to constitute the resilient coupling between the center case 5*e* and the internal gear 244*e*. The spring plate 208*e* includes alternately formed projected portions 285 and depressed portions 286. The resilient coupling thus made functions in the same manner as the resilient couplings in the foregoing embodiments. That is, when an excessive torque is imposed on the internal gear 244*e*, the internal gear 244*e* rotates relative to the center case 5*e* overcoming the resilient force of the spring plate 208*e*, while it stays connected with the center case 5*e* under the normal torque condition. The internal gear 244*e* moves within a limited angle under the varying torque condition. Because the spring plate 208*e* of this embodiment is placed at the radial outside of the internal gear as opposed to other embodiments in which the spring is disposed in the axial space of the device, the axial length of the reduction device can be made shorter.

The wave-shaped spring 208*e* may be modified for use in the reduction devices such as the fifth embodiment in which a spring is disposed between the end wall 52 of the center case 5 and the front surface 224 of the internal gear 244. In this case, a wave-shaped spring is used in place of the spring 208 and disposed between the end wall 52 of the center case 5 and the front surface 224 of the internal gear 244. On both surfaces facing the wave-shaped spring, bumps and depressions are formed.

Figure 21:
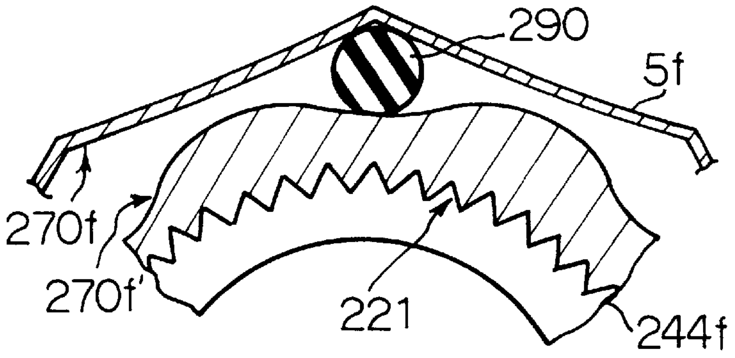
FIG. 21 is a partial cross-sectional view showing a combination of an internal gear, a rubber rod and a center case of an eighth embodiment according to the present invention.

FIG. 21 shows an eighth embodiment according to the present invention, in which rubber rods 290 are disposed between an internal gear 244*f* and a center case 5*f*, constituting the resilient coupling. Other structures are the same as those in the foregoing embodiments. An outer cylindrical portion of the center case 5*f* is formed in a polygon-like shape which constitutes a surface 270*f*. A surface 270*f*' with bumps and depressions is formed on the outer surface of the internal gear 224*f*.

The resilient coupling of the eighth embodiment functions in the same manner as other resilient couplings mentioned above. When an excessive torque is imposed on the internal gear 244*f*, it rotates relative to the center case 5*f*, overcoming an resilient force of the rubber rods 290. When a varying torque is imposed, the internal gear 244*f* moves back and forth within a limited angle, thereby absorbing the cranking impact force. Under the normal torque condition, the internal gear 244*f* rotates a little relative to the center case 5*f*, compressing the rubber rods 290, and stops at a position where the torque imposed on the internal gear 244*f* and the force compressing the rubber rods 290 balance.

Figure 22:
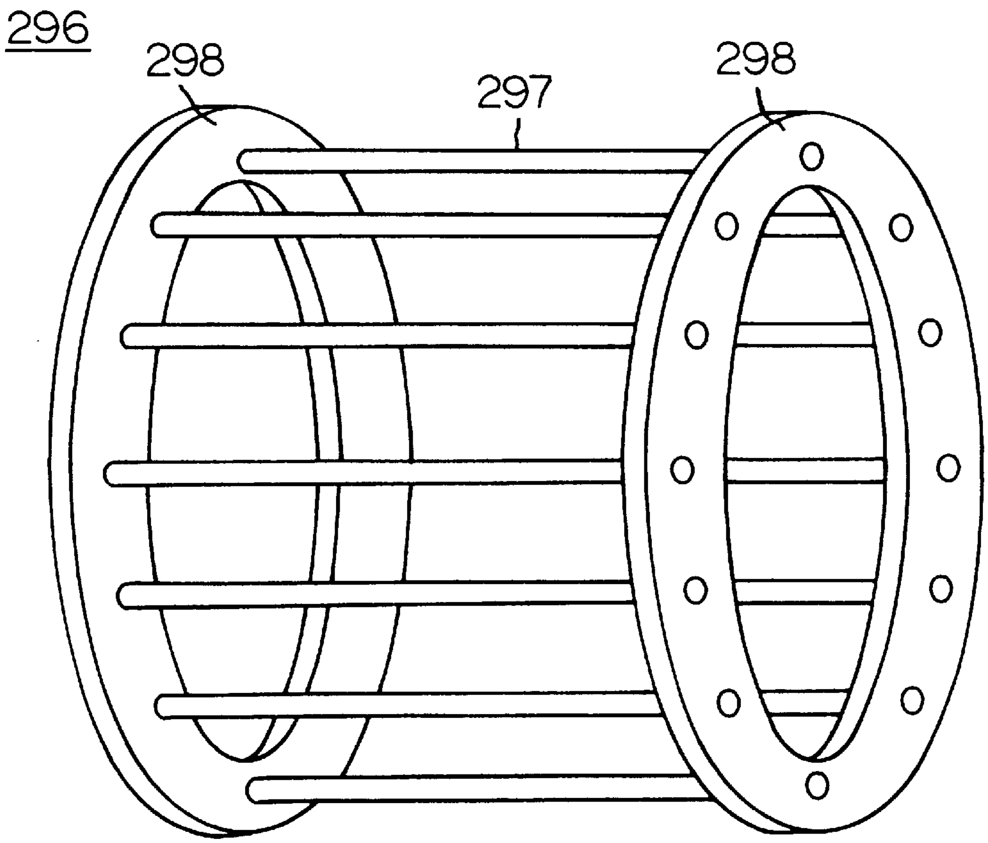
FIG. 22 is a perspective view showing a spring retainer in a modification of the eighth embodiment according to the present invention.

The eighth embodiment may be modified by replacing the rubber rods 290 with pipe-shaped springs. In this case, the pipe-shaped springs may be retained by a retainer to keep their positions. An example of the retainer 296 is shown in FIG. 22. The retainer 296 is composed of a pair of rings 298 and wire rods 297 connecting the pair of rings. Each wire rod 297 is inserted into the pipe-shaped spring when the retainer 296 is assembled. The retainer 296 can keep the pipe-shaped springs at their exact positions in the resilient coupling.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A starter comprising:

a housing;

a motor for generating a rotational torque to start an engine; and a planetary gear reduction device connected to the motor and disposed in the housing, which comprises a sun gear driven by the motor, a plurality of planetary gears engaging with the sun gear to be driven thereby, an internal gear disposed in the housing and engaged with the planetary gears, a drive shaft, connected to the planetary gears to be driven by an orbital rotation thereof around the sun gear, having a pinion operably connected thereto for rotating a ring gear of the engine, and coupling means connecting the internal gear to the housing, wherein:

a gear Module of the planetary gear reduction device is less than 1.0; and a reduction ratio of the planetary gear reduction device is higher than 6.0, and wherein:

under a condition where a rotational torque imposed on the internal gear is smaller than a predetermined value, the coupling means fixedly connects the internal gear to the housing;

under a condition where a rotational torque imposed on the internal gear is larger than the predetermined value, the coupling means loosens a connection between the internal gear and the housing for permitting a rotation of the internal gear relative to the housing, thereby relieving an excessive impact imposed on the reduction device at an instant the pinion engages with the ring gear of the engine; and under a condition where a varying rotational torque is imposed on the internal gear, the coupling means permits the internal gear to rotate back and forth relative to the housing within a small angle, thereby absorbing an impact force imposed on the reduction device and reducing a noise during a cranking period of the engine.

2. A starter according to claim 1, wherein the coupling means comprises a surface having bumps and depressions formed on either of the internal gear or the housing and projections fixed to the other, and the surface and the projections are in contact with each other to form a flexible coupling.

3. A starter according to claim 2, wherein the surface having bumps and depressions is formed on the internal gear and the projections are fixedly formed on the housing.

4. A starter according to claim 1, 2 or 3, wherein the internal gear is made of a material having a flexibility.

5. A starter according to claim 1, wherein the rotational torque generated by the motor in a period during which the pinion engages with the ring gear is smaller than a full torque in a cranking period, thereby reducing an impact force imposed on the reduction device at an instance of the gear engagement.

6. A starter according to claim 1, wherein the coupling means comprises a surface having bumps and depressions formed on either the internal gear or the housing and a spring fixed to the other, and the spring pushes against the surface to form a resilient coupling therebetween.

7. A starter according to claim 6, wherein the surface having bumps and depressions is formed on the internal gear and the spring is fixed to the housing.

8. A starter according to claim 7, wherein the spring has a shape of a disk having a plurality of portions contacting the surface having bumps and depressions, and is disposed between the internal gear and the housing so that the spring is biased in an axial direction of the reduction device.

9. A starter according to claim 7, wherein a rubber cushion is disposed between the housing and a back of the spring so that the spring pushes harder against the surface having bumps and depressions.

10. A starter according to claim 1, the coupling means comprises a surface having bumps and depressions formed on a cylindrical surface of the housing, and another surface having bumps and depressions formed on an outer cylindrical surface of the internal gear, and a resilient means interposed between both surfaces.

11. A starter according to claim 10, wherein the resilient means is a spring plate.

12. A starter according to claim 10, wherein the resilient means is a plurality of rubber rods disposed in parallel with an axial direction of the reduction device.

13. A starter comprising:

a housing;

a motor for generating a rotational torque to start an engine;

a planetary gear reduction device connected to the motor and disposed in the housing, which comprises a sun gear driven by the motor, a plurality of planetary gears engaging with the sun gear to be driven thereby, an internal gear disposed in the housing and engaged with the planetary gears, a drive shaft connected to the planetary gears to be driven by an orbital rotation thereof around the sun gear, having a pinion operably connected thereto for rotating a ring gear of the engine, and coupling means connecting the internal gear to the housing;

first impact absorbing means for absorbing an impact arising from an engagement of the pinion with the ring gear; and second impact absorbing means for absorbing an impact during a cranking period of the engine; wherein:

a gear Module of the planetary gear reduction device is less than 1.0; and a reduction ratio of the planetary gear reduction device is higher than 6.0.

14. A starter according to claim 13, wherein the first impact absorbing means performs its function by suppressing a rotational speed of the motor at the engagement of the pinion with the ring gear.

15. A starter according to claim 13 or 14, wherein the second impact absorbing means performs its function by allowing the internal gear to rotate relative to the housing or by flexion of the internal gear.

16. A starter comprising:

a housing;

a motor for generating a rotational torque to start an engine; and a planetary gear reduction device coupled to the motor and disposed within the housing, the planetary gear reduction device comprising:

a sun gear driven by the motor;

a plurality of planetary gears engaged with the sun gear to be driven thereby;

an internal gear disposed within the housing and engaged with the planetary gears;

a drive shaft coupled to the planetary gears to be driven by an orbital rotation of the planetary gears around the sun gear;

a pinion operably connected to the drive shaft for rotating a ring gear of the engine; and coupling structure connecting the internal gear to the housing, wherein, a gear Module of the planetary gear reduction device is less than 1.0 and a reduction ratio of the planetary gear reduction device is higher than 6.0, and wherein the coupling structure is constructed and arranged to (1) fixedly connect the internal gear to the housing to prevent relative rotation therebetween when a rotational torque imposed on the internal gear by the plurality of planetary gears is smaller than a predetermined value, (2) to permit rotation of the internal gear relative to the housing when the rotational torque imposed on the internal gear by the plurality of planetary gears is larger than the predetermined value, thereby relieving excessive impact imposed on the reduction device at an instant the pinion engages with the ring gear of the engine, and (3) permit the internal gear to rotate back and forth relative to the housing when a varying rotational torque is imposed on the internal gear by the plurality of planetary gears, thereby absorbing an impact imposed on the reduction device and reducing noise during a cranking period of the engine.

17. A starter according to claim 16, wherein the coupling structure comprises a surface having bumps and depressions formed on either of the internal gear or the housing and projections fixed to the other, and the surface and the projections are in contact with each other to form a flexible coupling.

18. A starter according to claim 17, wherein the surface having bumps and depressions is formed on the internal gear and the projections are fixedly formed on the housing.

19. A starter according to claims 16, 17, or 18, wherein the internal gear is made of a material having flexibility.

20. A starter according to claim 16, wherein the coupling structure comprises a surface having bumps and depressions formed on either the internal gear or the housing and a spring fixed to the other, and the spring pushes against the surface to form a resilient coupling therebetween.

21. A starter according to claim 20, wherein the surface having bumps and depressions is formed on the internal gear and the spring is fixed to the housing.

22. A starter according to claim 21, wherein the spring has a shape of a disk having a plurality of portions contacting the surface having bumps and depressions and is disposed between the internal gear and the housing so that the spring is biased in an axial direction of the reduction device.

23. A starter according to claim 21, wherein a rubber cushion is disposed between the housing and a back of the spring so that the spring pushes harder against the surface having bumps and depressions.

24. A starter according to claim 16, wherein the coupling structure comprises a surface having bumps and depressions formed on a cylindrical surface of the housing, another surface having bumps and depressions formed on an outer cylindrical surface of the internal gear, and a resilient member interposed between both surfaces.

25. A starter according to claim 24, wherein the resilient member is a spring plate.

26. A starter according to claim 24, wherein the resilient member is a plurality of rubber rods disposed in parallel with an axial direction of the reduction device.

* * * * *

UNITED STATES PATENT AND TRADEMARK OFFICE

CERTIFICATE OF CORRECTION

PATENT NO. : 5,857,380

DATED : January 12,1999

INVENTOR(S) : KAJINO, et al.

It is certified that error appears in the above-identified patent and that said Letters Patent is hereby corrected as shown below:

TITLE PAGE:

[30] Foreign Application Priority Data

Please change 3rd Priority Date

FROM:

| | | |
|---|---|---|
| February 16, 1998 | Japan | 8-029484 |

TO:

| | | |
|---|---|---|
| **February 16, 1996** | **Japan** | **8-029484** |

Signed and Sealed this

Twentieth Day of July, 1999

*Attest:*

Q. TODD DICKINSON

*Attesting Officer*

*Acting Commissioner of Patents and Trademarks*